United States Patent
Gersch et al.

(10) Patent No.: US 10,404,076 B2
(45) Date of Patent: Sep. 3, 2019

(54) METHOD AND SYSTEM FOR CHARGING AN ENERGY STORAGE DEVICE

(71) Applicant: Caterva GmbH, Pullach (DE)

(72) Inventors: Roland Gersch, Munich (DE); Markus Brehler, Baierbrunn (DE)

(73) Assignee: ALELION ENERGY SYSTEMS AB, Goeteborg (SE)

( * ) Notice: Subject to any disclaimer, the term of this patent is extended or adjusted under 35 U.S.C. 154(b) by 404 days.

(21) Appl. No.: 14/897,887

(22) PCT Filed: Jun. 11, 2013

(86) PCT No.: PCT/EP2013/061954
§ 371 (c)(1),
(2) Date: Dec. 11, 2015

(87) PCT Pub. No.: WO2014/198292
PCT Pub. Date: Dec. 18, 2014

(65) Prior Publication Data
US 2016/0149419 A1    May 26, 2016

(51) Int. Cl.
*H02J 3/38* (2006.01)
*H02J 7/00* (2006.01)
*H02J 3/32* (2006.01)

(52) U.S. Cl.
CPC .............. *H02J 7/0013* (2013.01); *H02J 3/32* (2013.01); *H02J 7/007* (2013.01); *H02J 7/0068* (2013.01); *H02J 7/00* (2013.01)

(58) Field of Classification Search
CPC ........................................................ H02J 3/32
USPC .................................................. 320/107, 132
See application file for complete search history.

(56) References Cited

U.S. PATENT DOCUMENTS

| | | | | |
|---|---|---|---|---|
| 2010/0090532 A1* | 4/2010 | Shelton | ..................... | H02J 3/32 307/46 |
| 2011/0245987 A1* | 10/2011 | Pratt | ..................... | H01M 10/44 700/295 |
| 2014/0070756 A1* | 3/2014 | Kearns | ..................... | H02J 7/007 320/101 |

FOREIGN PATENT DOCUMENTS

| | | |
|---|---|---|
| EP | 2 139 090 A1 | 12/2009 |
| EP | 2 190 097 A1 | 5/2010 |
| EP | 2 521 238 A1 | 11/2012 |
| WO | 2007/104167 A1 | 9/2007 |
| WO | 2013/046657 A1 | 4/2013 |
| WO | 2013/068256 A1 | 5/2013 |

OTHER PUBLICATIONS

International Search Report and Written Opinion for International Application No. PCT/EP2013/061954, dated Mar. 3, 2014, 9 pages.

* cited by examiner

*Primary Examiner* — Edward Tso
*Assistant Examiner* — Ahmed H Omar
(74) *Attorney, Agent, or Firm* — Westman, Champlin & Koehler, P.A.

(57) ABSTRACT

A charging system (C-SYS) for charging at least one energy storage device (ESD) of a power grid (PG) according to a response curve (RC) indicating a power supplied by said energy storage device (ESD) to said power grid (PG) or absorbed by said energy storage device (ESD) from said power grid (PG) depending on at least one grid parameter of said power grid (PG), wherein in a dead band (DB) around a target value of said grid parameter a selected response curve (RC) is applied.

17 Claims, 3 Drawing Sheets

METHOD AND SYSTEM FOR CHARGING AN ENERGY STORAGE DEVICE

CROSS-REFERENCE TO RELATED APPLICATION

This Application is a Section 371 National Stage Application of International Application No. PCT/EP2013/061954, filed 11 Jun. 2013 and published as WO 2014/198292 A1 on 18 Dec. 2014, in English, the contents of which are hereby incorporated by reference in their entirety.

The invention relates to a method and system for charging at least one energy storage device adapted to perform grid services for a power grid.

A power grid supplies distributed consumers with electrical power. These consumers can be located in distributed buildings where electrical devices such as washing machines or refrigerators consume electrical power as loads. Houses or buildings can comprise an inhouse grid which is connected to a local distribution grid which in turn can be connected via interconnects to a transmission grid of the power grid. In power grids, the use of distributed energy sources and energy storage devices increases significantly. Distributed energy storage devices can be formed by electronic storage devices comprising capacitors, by electro-chemical storage devices such as accumulators or batteries, by mechanical storage devices such as flywheels and by thermal storage devices. The distributed energy sources can comprise renewable energy sources such as wind farms or solar power plants. These renewable energy sources generate electrical power which is supplied to the power grid, wherein the amount of the generated power depends on the local environment, in particular the weather and wind conditions.

Conventional public electricity grids are based on alternating currents. The typical target frequencies of these alternating currents are 50 Hz in Europe or 60 Hz in the United States. The equipment connected to the power grid is typically unable to operate when significant deviations from the predetermined target frequency of the power grid occur. For example, transmission system operators in Europe contract equipment operators to commence stabilization measures as soon as the grid frequency of the power grid deviates by more than 0.01 Hz up or down from the target frequency of 50 Hz.

Accordingly, the frequency of the alternating currents within the power grid has to be kept at all times in a predetermined frequency range. To achieve this, stabilization measures for stabilizing the frequency within the power grid are performed. These stabilization measures either supply power to the power grid or remove power from the power grid in order to stabilize the frequency within the power grid. This mechanism can also be used to stabilize other parameters in the power grid, e.g. voltage stabilization in a sub-grid, especially when multiple decentralized strongly fluctuating power sources or sinks are connected therein. These grid services can be performed by energy storage devices such as batteries. For energy storage devices in grid service operation, it is necessary to actively maintain their state of charge (SOC) at a level that enables them to emit or absorb electrical power for a minimum amount of time. Examples for situations in which an energy storage device would not maintain the necessary state of charge are provided. Example 1: in a primary control operation, an energy storage device such as a battery may be required to discharge on average 10% of the maximum allotted power for an entire day, which would fully drain a typical battery multiple times. Example 2 is the charging of the energy storage device by a grid service operation until the energy storage device has reached a state of charge of 100%. Example 3 is the slower overall discharge of the energy storage device resulting from efficiency losses in the energy storage device which occurs even in an operation where charge and discharge are balanced and sufficiently concurrent not to drain the energy storage device. Example 4 is any operation where a grid service is combined with another storage operation, which independently charges or discharges the energy storage device.

To maintain the state of charge of the energy storage devices at a level that enables the energy storage devices to emit or absorb electrical power for a minimum amount of time, so far energy storage devices have been combined or pooled with generating equipment. The generating equipment increases its power as necessary for the grid service if the energy storage device is drained and it reduces its power output as necessary for the grid service if the energy storage device is fully loaded.

Accordingly, there is a need for a charging system for an energy storage device for a power grid performing grid services that allows to charge the energy storage device efficiently and without the necessity of combining the energy storage device with power generating equipment. Such a charging system could emit or absorb active as well as reactive power depending on the type of grid service performed. In the following, the term "power" is used to mean active power or reactive power depending on grid service performed.

This object is achieved by a charging system comprising the features of claim 1.

According to a first aspect of the present invention, a charging system for charging at least one energy storage device of a power grid is provided.

According to a possible embodiment of the charging system according to the first aspect of the present invention, the charging system is provided for charging at least one energy storage device of a power grid according to a response curve indicating a power supplied by said energy storage device to said power grid or absorbed by said energy storage device from said power grid depending on at least one grid parameter of said power grid, wherein in a dead band around a target value of said grid parameter a selected response curve is applied.

An advantage of the charging system according to the first aspect of the present invention is that the operation lifetime of the energy storage device is increased.

In a possible embodiment of the charging system according to the first aspect of the present invention, the energy storage device is connected to a converter connected to the power grid via a grid connection of said charging system.

The provision of a converter has the advantage that energy storage devices producing various types of current such as DC or variable-frequency AC can be connected to a fixed-frequency AC grid and that the converter can implement the selectable response curve thus increasing flexibility of the charging system.

In a possible embodiment of the charging system according to the first aspect of the present invention, a power emitted by said converter to said grid connection or absorbed by said converter from said grid connection is set according to the selected response curve applied by an energy resource controller of the charging system to said converter.

The use of selectable response curves applied by an energy resource controller to the converter provides a high flexibility of the charging system and allows the use of the charging system for a wide range of applications.

In a possible embodiment of the charging system according to the first aspect of the present invention, the energy resource controller has access to a memory storing response curves indicating the power to be supplied by said energy storage device to said power grid or to be absorbed by said energy storage device from said power grid depending on at least one observed grid parameter of said power grid.

In this way the stored response curves are adapted to adjust the power efficiently to the current situation within the power grid.

In a further possible embodiment of the charging system according to the first aspect of the present invention, the energy resource controller is connected to a local grid parameter measurement device to receive measured local grid parameters of the power grid.

Due to the use of locally measured grid parameters the energy resource controller has the advantage that the energy resource controller can operate even when a communication link to a remote control unit fails.

In a further possible embodiment of the charging system according to the first aspect of the present invention, the local grid parameter measurement device provides results with a known precision, accuracy and temporal resolution which allow the energy resource controller to calculate an upper bound for the error of the grid parameter measurement.

This embodiment has the advantage that the energy resource controller can adjust the response curves by narrowing the dead band by the error, thus preventing a de-stabilization of the power grid.

In a further possible embodiment of the charging system according to the first aspect of the present invention, the energy resource controller is connected via a communication device to a central or distributed control unit to receive grid parameters of the power grid.

By provision of a communication device, it is possible for the energy resource controller to receive grid parameters from a control unit via a communication link so that the energy resource controller can also take into account grid parameters measured at other locations within the power grid. In the case of the grid frequency, it is also possible for the energy resource controller to adjust the upper bound for the error of the local grid parameter measurement by comparison with other measurements.

In a still further possible embodiment of the charging system according to the first aspect of the present invention, the applied response curve is selected by the energy resource controller from the response curves stored in the memory depending on the monitored state of charge of the energy storage device.

This embodiment has the advantage that the operation lifetime of the energy storage device is increased.

In a further possible embodiment of the charging system according to the first aspect of the present invention, the observed grid parameter is at least one of the grid frequency of the power grid, the voltage at one or several given locations in the power grid, the power flow at one or several given locations in the power grid, and the phase shift between voltage and current at one or several locations in the power grid.

In a further possible embodiment of the charging system according to the first aspect of the present invention, a first response curve is stored in the memory which inhibits a power emission of the converter to said grid connection in the dead band if the observed grid parameters indicate an undersupply of the power grid by comparison with target grid parameter values and which allows a power absorption of the converter from the grid connection in the dead band if the observed grid parameters indicate an oversupply of the power grid by comparison with a target grid parameter values.

In a still further possible embodiment of the charging system according to the first aspect of the present invention, a second response curve is stored in the memory which inhibits a power absorption of the converter from the grid connection in the dead band if the observed grid parameters indicate an oversupply of the power grid by comparison with a target grid parameter values and which allows a power emission of the converter to the grid connection in the dead band if the observed grid parameters indicate an undersupply of the power grid by comparison with a target grid parameter values.

In a further possible embodiment of the charging system according to the first aspect of the present invention, the first response curve stored in the memory is selected by the energy resource controller if the monitored state of charge of the energy storage device is low.

This has the advantage that the operation lifetime of the energy storage device is increased.

In a still further possible embodiment of the charging system according to the first aspect of the present invention, the second response curve is selected by the energy resource controller if the monitored state of charge of the energy storage device is high.

This has also the advantage that the operation lifetime of the energy storage device is increased.

In a still further possible embodiment of the charging system according to the first aspect of the present invention, a third response curve is stored in the memory which inhibits a power emission of the converter to the grid connection and which inhibits a power absorption of the converter from the grid connection in the whole dead band around the target grid parameter.

Since unnecessary charging and/or discharging is inhibited this has the advantage that the operation lifetime of the energy storage device is increased.

In a possible embodiment of the charging system according to the first aspect of the present invention, the third response curve is selected by the energy resource controller if the monitored state of charge of the energy storage device is in an intermediate range between a low threshold value and a high threshold value.

In a further possible embodiment of the charging system according to the first aspect of the present invention, the applied response curve is selected by the energy resource controller from the response curves stored in the memory depending on the monitored state of charge of the energy storage device and depending on additional information data supplied to said energy resource controller.

The advantage of this embodiment is that the energy resource controller can also take into account additional circumstances to select the most suitable response curve applied to the converter.

In a possible embodiment of the charging system according to the first aspect of the present invention, the information data supplied to the energy resource controller comprises time information data, in particular a current date and time of the location of the charging system.

This has the advantage that a power supply to the power grid depending on the day time can be taken into account, avoiding situations with adverse states of charge and thus prolonging the life of the energy storage device.

In a further possible embodiment of the charging system according to the first aspect of the present invention, the information data further comprises forecast information data, in particular weather forecast and pricing data.

This has the advantage that a power supply to the power grid depending on weather conditions, in particular sunshine and/or wind can be taken into account, avoiding situations with adverse states of charge and thus prolonging the life of the energy storage device.

In a still further possible embodiment of the charging system according to the first aspect of the present invention, the information data supplied to the energy resource controller comprises sensor data, in particular temperature data.

This has the advantage that a power supply to the power grid depending on the environment can be taken into account, avoiding situations with adverse states of charge and thus prolonging the life of the energy storage device.

In a still further possible embodiment of the charging system according to the first aspect of the present invention, the information data supplied to the energy resource controller comprises charging/discharging history data.

This has the advantage that a current power supply situation in the power grid can be estimated from previous charging/discharging processes, avoiding situations with adverse states of charge and thus prolonging the life of the energy storage device.

In a still further possible embodiment of the charging system according to the first aspect of the present invention, the information data supplied to the energy resource controller comprises type data indicating a type of the energy storage device.

This has the advantage that the charging/discharging process of the energy storage device can be adapted to the type of the energy storage device thus increasing its operation lifetime.

In a further possible embodiment of the charging system according to the first aspect of the present invention, the applied response curve is selected by the energy resource controller from the response curves stored in the memory depending on information data received from other energy resource controllers via the communication device.

This has the advantage that the power supply situation at other locations of the power grid can be taken into account, thereby balancing the charging between multiple energy storage devices and thus prolonging the life of the energy storage devices.

According to a second aspect of the present invention, a power grid comprising a plurality of energy storage devices is provided having the features of claim 17.

According to this aspect of the present invention, a power grid comprising a plurality of energy storage devices is provided wherein at least a portion of the energy storage devices is equipped with a charging system according to the first aspect of the present invention.

This has the advantage that not all energy storage devices must be equipped with a charging system according to the present invention so that the charging system can be used in an already existing power grid.

In a possible embodiment of the power grid according to the second aspect of the present invention, the energy storage devices which are equipped with a charging system according to the first aspect of the present invention transmit information about the response curve selected for each individual charging system to each other.

In this way different energy storage devices which can belong to different users or operators can be aligned in their charging/discharging behaviour to stabilize the power supply in the power grid efficiently.

In a possible embodiment of the power grid according to the second aspect of the present invention, a control unit of the power grid is provided and the energy storage devices which are equipped with a charging system according to the first aspect of the present invention transmit data to said control center.

This has the advantage that a central control unit can align the discharging and/or charging of distributed energy storage devices to each other to stabilize the power supply in the power grid.

In a further possible embodiment of the power grid according to the second aspect of the present invention, said control unit of the power grid transmits control values to the energy storage devices which are equipped with a charging system according to the first aspect of the present invention.

The advantage of this embodiment is that if the aggregate state of charge of all energy storage devices is lower (higher) than a predetermined aggregate threshold, all energy storage devices can be caused to charge (discharge) themselves in the dead band even though not all individual states of charge of the individual energy storage devices are lower than the individual thresholds. Furthermore, a balancing of the individual states of charge of the individual energy storage devices can be achieved.

According to a third aspect of the present invention, a method for charging an energy storage device of a power grid is provided.

According to this aspect of the present invention, a method for charging an energy storage device of a power grid according to a response curve indicating a power supplied by said energy storage device to said power grid or absorbed by said energy storage device from said power grid depending on at least one observed grid parameter of said power grid is provided, wherein in a dead band around a target value of said observed grid parameter a selected response curve is applied.

By employing the method according to the third aspect of the present invention the operation lifetime of the energy storage device is increased. Further the method can be implemented by a program thus increasing flexibility to system changes.

According to a possible embodiment of the method according to the third aspect of the present invention, a power emitted by a converter to a grid connection or absorbed by the converter from the grid connection is set according to the selected response curve applied by an energy resource controller to the converter.

This has the advantage that energy storage devices producing various types of current such as DC or variable-frequency AC can be connected to a fixed-frequency AC grid and that the converter can implement the selectable response curves thus increasing flexibility and efficiency of the method.

According to a possible embodiment of the method according to the third aspect of the present invention, the applied response curve is selected by the energy resource controller from response curves stored in a memory depending on a monitored state of charge of the respective energy storage device.

This has the advantage that the operation lifetime of the energy storage device is increased.

In the following, possible embodiments of the different aspects of the present invention are described with reference to the enclosed figures in more detail.

Figure 1:
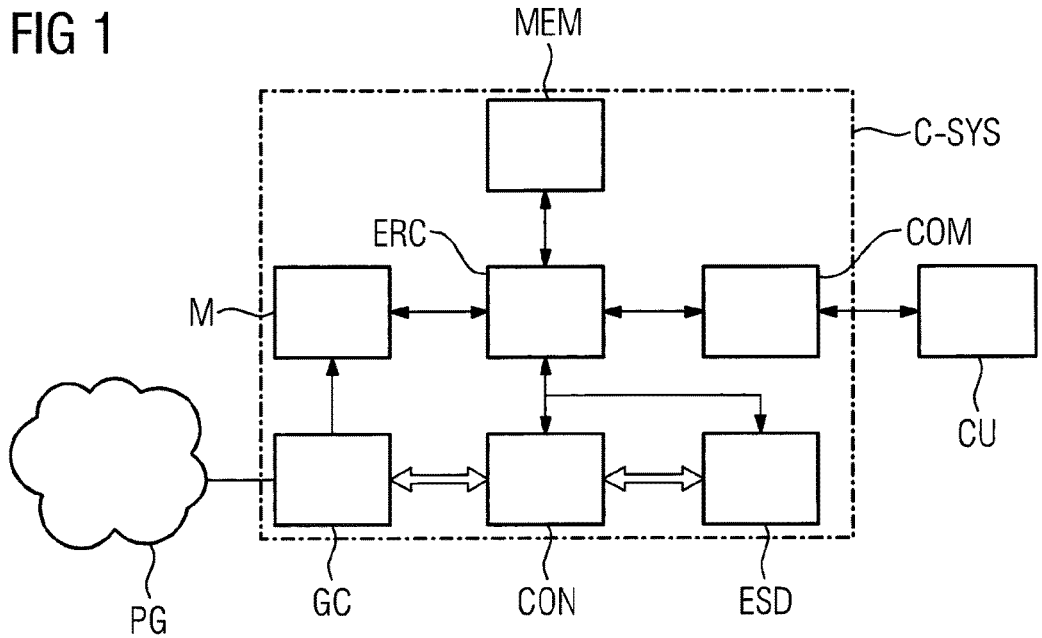
FIG. 1 shows a block diagram of a possible embodiment of a charging system according to the first aspect of the present invention.

As can be seen in FIG. 1, a charging system C-SYS comprises in the shown embodiment of the present invention different components or entities. In the shown embodiment, the charging system comprises a grid connection GC such as a power clamp connected to a power grid PG. The power grid PG is a power supply grid which is adapted to supply power to a plurality of consumers. Further, the power grid PG can comprise energy sources which feed electrical power into the power grid. The power grid PG can comprise a target frequency of e.g. 50 Hz in Europe. The power grid comprises several grid parameters including e.g. frequency, voltage, current and electrical phase. A further possible observed grid parameter can comprise harmonics within the power grid PG. The charging system C-SYS comprises one or several local grid parameter measurement devices M to receive local grid parameters of the power grid PG. The local grid parameter measurement device M is connected to an energy resource controller ERC of the charging system as illustrated in FIG. 1. The energy resource controller ERC receives measured local grid parameters from the local grid parameter measurement device M. These grid parameters can for instance comprise the grid frequency f of the power grid PG. In the embodiment shown in FIG. 1, the energy resource controller ERC is further connected via a communication device COM to a central or distributed power grid control unit to receive grid parameters of the power grid from other locations. In a possible embodiment, the communication device COM comprises a wireless communication device such as a transmitter, in particular a GPRS transmitter or a UMTS transmitter. In an alternative embodiment, the communication device COM can comprise a wired electronic communication device such as a modem, in particular a DSL modem, an ISDN modem or an analog modem. Further, the communication device COM can comprise a power line communication modem. In a possible embodiment of the charging system C-SYS according to the first aspect of the present invention, the charging system C-SYS does not comprise a communication device COM, but works autonomously by evaluating only local grid parameters. In the embodiment shown in FIG. 1, the energy resource controller ERC does not only receive local grid parameters but also remote grid parameters from remote entities via the control unit CU of the power grid.

The energy resource controller ERC can be formed by a programmable logic controller. The energy resource controller ERC is connected to at least one energy storage device ESD which is adapted to store power. The energy storage device ESD can be formed in a possible embodiment by an energy storage device requiring DC charging and discharging such as capacitors and/or electrochemical storage devices such as accumulators or batteries. The energy storage device ESD can also be formed by other energy storage devices including mechanical storage devices such as flywheels or thermal devices adapted to store thermal energy. The energy state of the energy storage device ESD can be monitored by the energy resource controller ERC. The energy resource controller ERC is further connected to a controllable converter CON which can be formed for instance by a controlled AC/DC-converter in the case of an energy storage device requiring DC charging and discharging or by a variable-frequency drive in other cases. The converter is connected to the energy storage device ESD as shown in FIG. 1, wherein in the case of an energy storage device ESD requiring DC charging and discharging the converter CON is adapted to transform DC current of the energy storage device ESD to an AC current for the power grid PG. In the embodiment shown in FIG. 1, the energy resource controller ERC has further access to a memory MEM. In the embodiment shown in FIG. 1, the memory MEM is provided at the location of the charging system C-SYS. In a further possible embodiment, the memory MEM can also be accessible by the energy resource controller ERC via the communication device COM and a communication link.

The charging system C-SYS as illustrated in FIG. 1 is provided for charging the at least one energy storage device ESD according to a response curve RC which can be stored in the local memory MEM. The response curve RC indicates a power supplied by the energy storage device ESD to the power grid PG or absorbed by the energy storage device ESD from the power grid PG depending on at least one grid parameter of the power grid PG. In a dead band DB around a target value of the grid parameter a selected response curve RC is applied by the energy resource controller ERC. The response curve RC is applied by the energy resource controller to the converter CON which is connected to the power grid PG via the grid connection GC of the charging system C-SYS as shown in FIG. 1. The power emitted by the converter CON to the grid connection GC or absorbed by the converter CON from the grid connection GC is set in a possible embodiment according to the selected response curve RC applied by the energy resource controller ERC of the charging system C-SYS to the converter CON. The energy resource controller ERC has access to the memory MEM which stores the response curves RC indicating the power to be supplied by the energy storage device ESD to the power grid PG or to be absorbed by the energy storage device ESD from the power grid PG depending on at least one grid parameter of the power grid. Grid parameters can be received by the energy resource controller ERC from the local grid parameter measurement device M and/or via the communication device COM from the central or distributed control unit CU.

In a possible embodiment of the charging system C-SYS according to the first aspect of the present invention, the energy resource controller ERC is adapted to monitor a state of charge SOC of the energy storage device ESD. The state of charge SOC indicates the ratio of the currently stored energy to the total energy storage capacity of the energy storage device ESD. If the energy storage capacity of the energy storage device is fully used, the state of charge SOC is 100%. In a possible embodiment, the applied response curve RC is selected by the energy resource controller ERC from the response curves stored in the memory MEM depending on the monitored state of charge SOC of the energy storage device ESD. The energy resource controller ERC can select a response curve applied to the converter CON. The grid parameters received from the local grid parameter measurement device M and/or through the communication device COM are specified so that a precision, accuracy and/or temporal resolution with which the grid parameters pertinent for the grid service operation are known to the energy resource controller ERC are higher than is required for the performance of the grid service. By this feature, a so-called dead band DB of parameter ranges where the energy resource controller ERC has discretion on whether a grid service will be rendered by the system is provided. In a possible embodiment, this dead band DB can also be specified externally, for instance by a grid operator of the power grid PG. In the case of the dead band DB being specified externally, the precision, accuracy and/or temporal resolution with which the grid parameters pertinent for the grid service operation are known to the energy resource controller ERC must provide an upper bound for the error of the grid parameter measurement which is smaller than half the dead band DB. The energy resource controller ERC uses the discretion on whether a grid service will be rendered by the system in a possible embodiment to emit power when the state of charge SOC of the energy storage device ESD is high and emission of power for grid services is possible, but not required, and vice versa for absorption of power. Thereby, depending on the grid service requirements, the capacity of the energy storage device ESD and the precision, accuracy and/or temporal resolution of the grid parameters available to the energy resource controller ERC, the state of charge SOC of the energy storage device ESD can be maintained at a level that enables the energy storage device ESD to emit or absorb electrical power in a predetermined minimum period of time. By using the discretion when operating in the dead band DB, the need for pooling the energy storage devices ESD with generating equipment in order to ensure availability for grid services is reduced or even eliminated.

Figure 2:
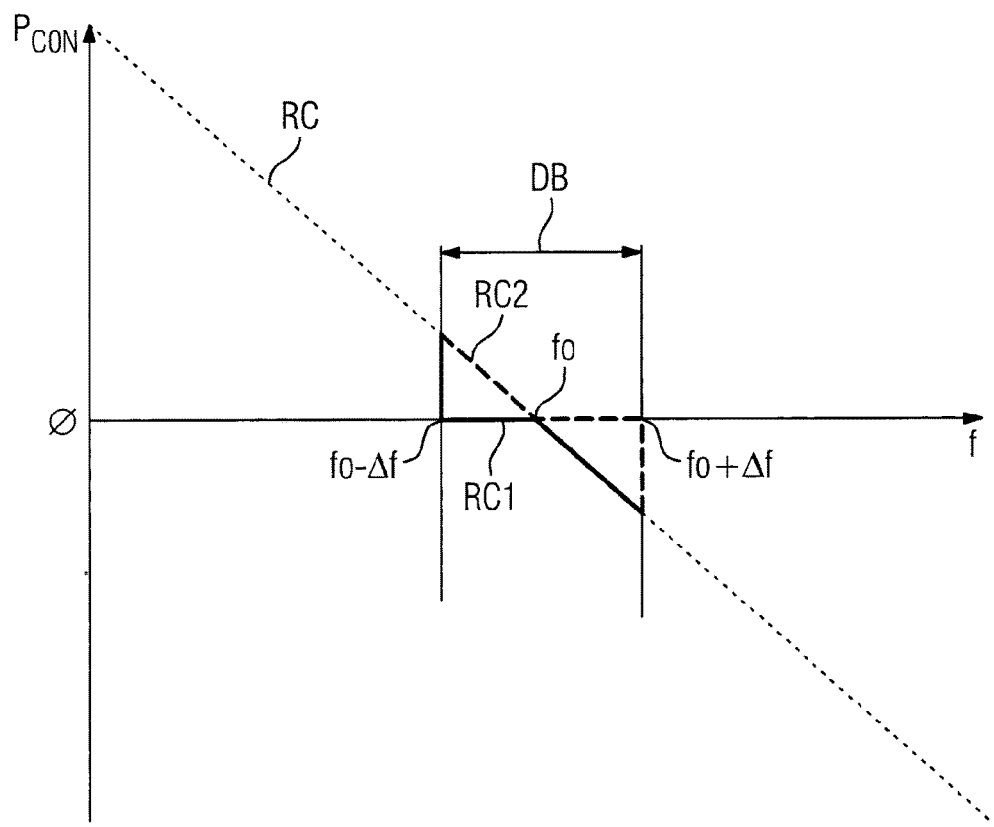
FIG. 2 shows a diagram for illustrating response curves which can be applied by a charging system according to the first aspect of the present invention.

In the following, a possible embodiment of the charging system C-SYS is described in more detail, wherein the observed grid parameter of the power grid PG is the grid frequency f of the power grid. The target frequency of the power grid PG is predetermined. In Europe, the target frequency of the power grid PG is 50 Hz. Around the target frequency, a dead band DB can be defined. In a possible embodiment, the dead band DB around the target frequency is 50±0.01 Hz. FIG. 2 shows possible response curves RC1, RC2 which can be used by the charging system C-SYS according to the first aspect of the present invention. In the shown exemplary diagram, the power emission of the converter CON to the grid connection GC and the power absorption of the converter CON from the grid connection GC depending on the frequency f of the power grid is illustrated as a response curve RC. Around a target frequency $f_0$ (e.g. 50 Hz), a predetermined dead band DB is defined, e.g. ±0.01 Hz. Outside the dead band DB, the response curve RC is a linear declining response curve. A positive power $P_{CON}$ of the converter CON indicates that power is emitted by the converter CON to the grid connection GC, whereas a negative value of the power $P_{CON}$ indicates that power is absorbed by the converter CON from the grid connection GC. Outside the dead band DB, if the grid frequency f of the power grid PG is much lower than the target frequency $f_0$, the converter CON is controlled to emit power to the power grid PG via the grid connection GC to stabilize the observed grid frequency f as illustrated by the response curve RC in FIG. 2. The emitted power is received by the converter CON from the energy storage device ESD. Accordingly, the energy storage device ESD such as a battery provides electrical energy to the converter CON which emits the power to the power grid PG to increase the frequency f of the power grid PG. In the same manner, outside the dead band DB, if the frequency f of the power grid PG is too high, the converter CON is controlled by the energy resource controller ERC to absorb power from the power grid PG to stabilize the frequency f, wherein the absorbed power is provided by the converter CON to the energy storage device ESD where it is stored.

As can be seen in FIG. 2, within a predetermined dead band DB, the energy resource controller ERC of the charging system C-SYS has discretion to apply specific response curves RC such as response curves RC1, RC2 as illustrated in FIG. 2. These response curves RC1, RC2 can be stored in a memory MEM of the charging system C-SYS. The first response curve RC1 inhibits a power emission of the converter CON to the grid connection GC within the dead band DB, if the observed grid frequency f is lower than the target frequency $f_0$ of the power grid PG and allows a power absorption of the converter CON from the grid connection GC in the dead band DB, if the observed grid frequency f is higher than the target grid frequency $f_0$ of the power grid PG. In a preferred embodiment, this first response curve RC1 is selected by the energy resource controller ERC if the monitored state of charge SOC of the energy storage device ESD is low, i.e. beneath a predetermined threshold value SOC-L. This threshold value SOC-L can be adjustable. In a possible embodiment, the lower threshold value SOC-L can be for instance a state of charge of 40%. If the first response curve RC1 is selected and the state of charge SOC of the energy storage device ESD is low, possibilities or opportunities to charge the energy storage device ESD are seized, whereas opportunities to discharge the energy storage device ESD are not seized.

As can be seen in FIG. 2, the second response curve RC2 is also stored in the memory MEM. This second response curve RC2 inhibits a power absorption of the converter CON from the grid connection GC in the dead band DB if the observed grid frequency f is higher than the target frequency $f_0$ of the power grid PG and which allows a power emission of the converter CON to the grid connection GC in the dead band DB if the observed grid frequency f is lower than the target frequency $f_0$ of the power grid PG. The second response curve RC2 is shown as a dashed line in FIG. 2. Accordingly, the response curves RC1, RC2 selected or chosen if the state of charge SOC is outside the target range are asymmetric as shown in FIG. 2. The second response curve RC2 is selected by the energy resource controller ERC if the monitored state of charge SOC of the energy storage device ESD is high, i.e. higher than a high threshold value SOC-H. In a possible embodiment, this high threshold value SOC-H is adjustable. In a possible embodiment, the high threshold value SOC-H is a state of charge SOC of 60%.

Figure 6:
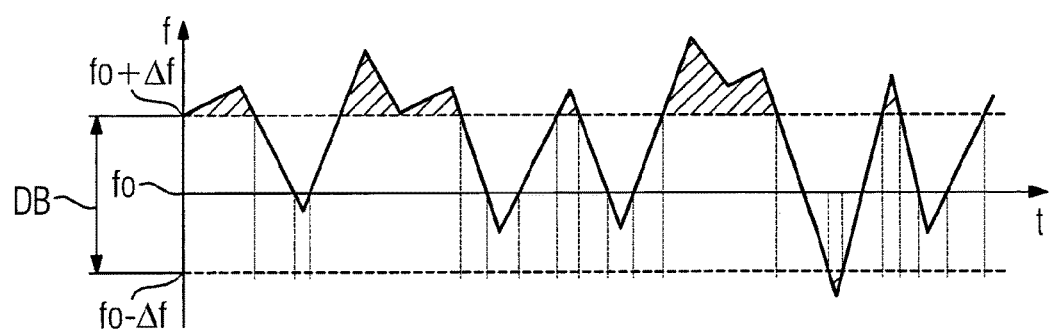
FIG. 6 shows a timing diagram for illustrating the operation of a charging method and system according to the present invention.

In a possible embodiment of the charging system C-SYS, the energy resource controller ERC does select a response curve RC adapted to the state of charge SOC of the energy storage device ESD. The response curve RC is defined as the level of power emission/absorption set on the converter CON for every possible condition of the power grid PG as specified by one or more grid parameters such as the frequency f. The response curve RC selected by the energy resource controller ERC and applied to the converter CON is asymmetric if the state of charge SOC of the energy storage device ESD is outside a target range. This target range is limited by a low SOC threshold value SOC-L and a high SOC threshold value SOC-H. The use of asymmetric response curves RC leads to a grid-serving charging of the energy storage device ESD if the power grid PG is oversupplied with power and the monitored grid parameter is in the dead band DB and to a grid-serving discharging of the energy storage device ESD if the power grid PG is undersupplied with power and the monitored grid parameter is in the dead band DB. This is also illustrated in the timing diagram of FIG. 6. Outside the dead band DB if the frequency f of the power grid PG deviates significantly from the target frequency $f_0$, a forced charging or discharging of the energy storage device ESD takes place. The target frequency $f_0$ is for instance 50 Hz. The dead band DB around the target frequency is in a possible embodiment 50±0.01 Hz. Accordingly, if the frequency f is higher than 50.01 Hz, a forced charging of the energy storage device ESD is performed. If the frequency f of the power grid PG is lower than 49.99 Hz, a forced discharging of the energy storage device ESD takes place. Within the dead band DB, the energy resource controller ERC has discretion to select response curves RC taking into account the current state of charge SOC of the energy storage device ESD to keep the state of charge SOC of the energy storage device ESD in a SOC target range, for instance within a range of 40 to 60%.

Depending on the state of charge SOC of the energy storage device ESD, the response curve RC is selected by the energy resource controller ERC from different response curves stored in the memory MEM. For instance, the first response curve RC1 as illustrated in FIG. 2 is selected by the energy resource controller ERC if the monitored state of charge SOC of the energy storage device ESD is low, e.g. beneath 40%, while the second response curve RC2 is selected by the energy resource controller ERC if the monitored state of charge SOC of the energy storage device ESD is high, e.g. higher than 60%.

Figure 3:
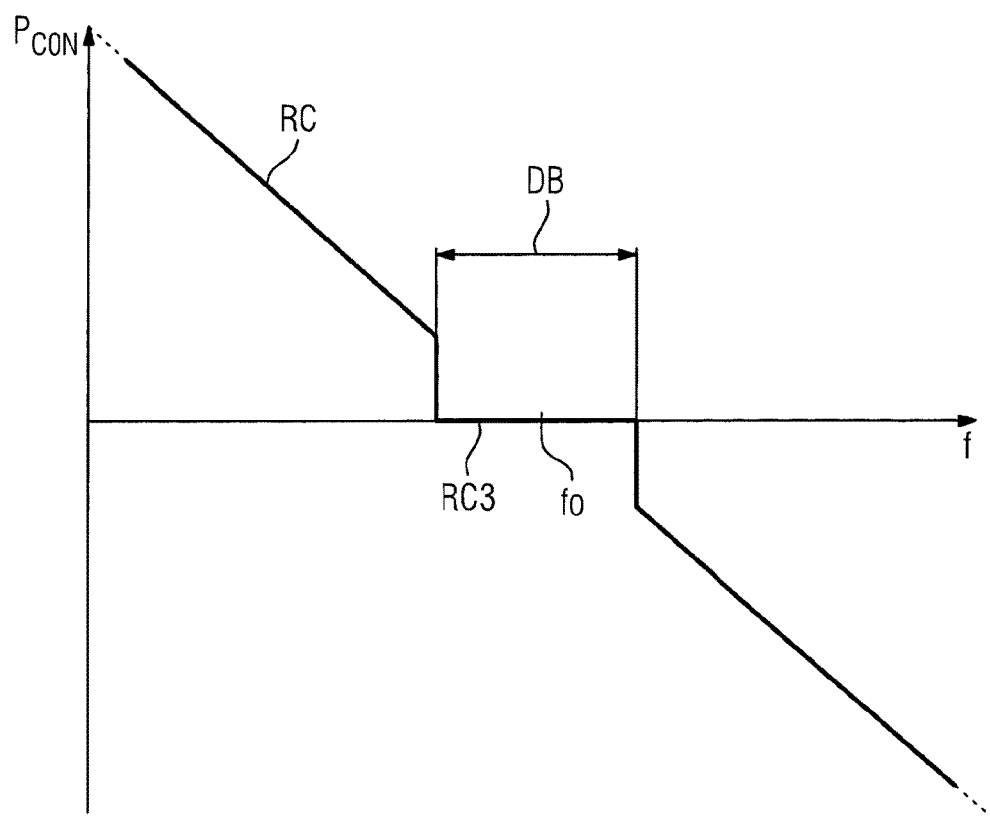
FIG. 3 shows a diagram for illustrating a further possible charging curve applied by a possible embodiment of the charging system according to the first aspect of the present invention.
Figure 4:
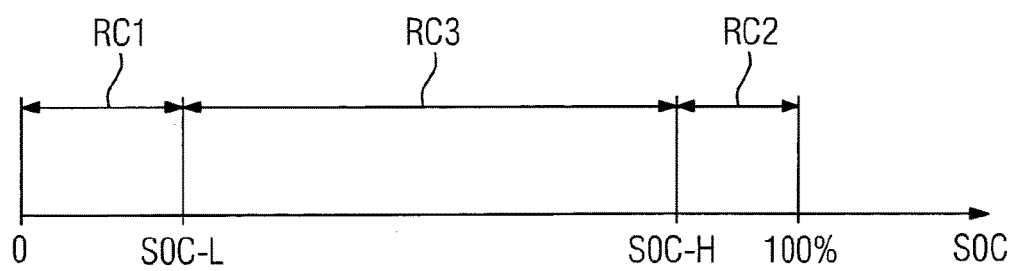
FIG. 4 shows a diagram for illustrating a selection of response curves depending on a state of charge of an energy storage device according to a possible embodiment of the charging system according to the first aspect of the present invention.

In a further possible embodiment of the charging system C-SYS according to the first aspect of the present invention, a further third response curve RC3 can be stored in the memory MEM as illustrated in the diagram of FIG. 3. The third response curve RC3 inhibits a power emission of the converter CON to the grid connection GC and also inhibits a power absorption of the converter CON from the grid connection GC in the whole dead band DB around the target grid frequency $f_0$. In a possible implementation, the third response curve RC3 as illustrated in FIG. 3 is selected by the energy resource controller ERC if the monitored state of charge SOC of the energy storage device ESD is in an intermediate range between a low threshold value SOC-L and a high threshold value SOC-H as also illustrated in FIG. 4.

Figure 5:
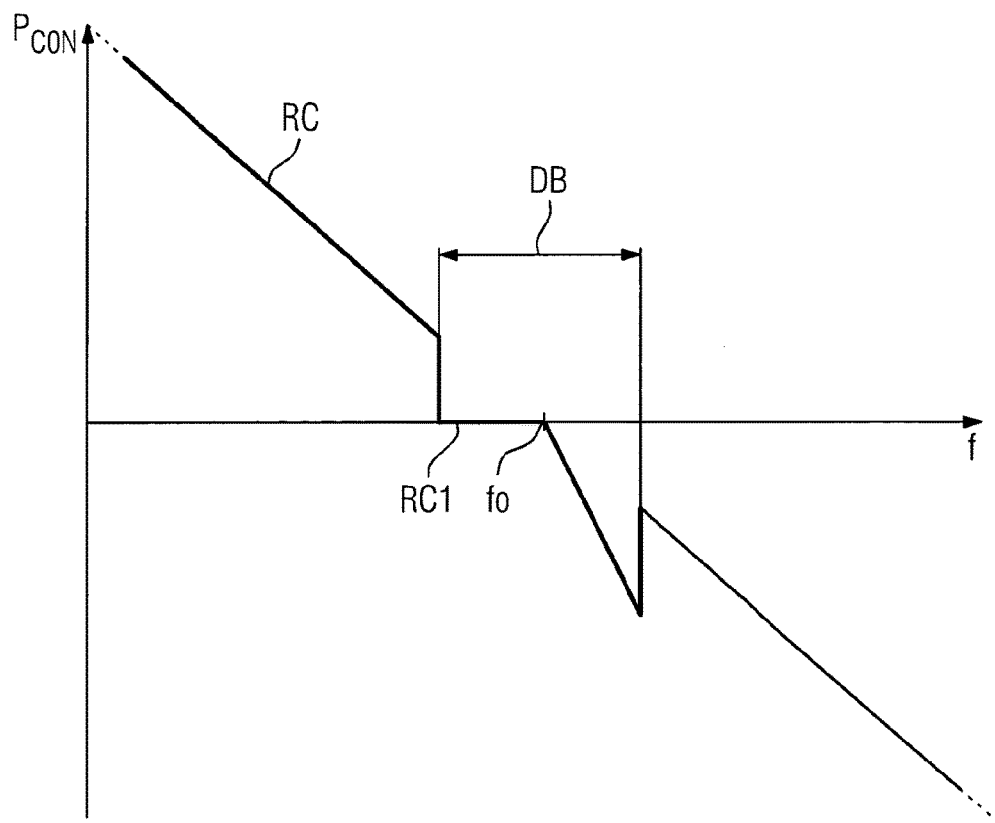
FIG. 5 shows a diagram for illustrating further possible implementations of response curves as employed by a system and method for charging an energy storage device according to the present invention.

In a possible implementation, multiple different response curves are defined and mapped to specific state of charge intervals. The charging, discharging nature of a response curve can be captured numerically by integration of the response curve over the dead band DB. In a possible embodiment, the droop of a response curve RC in the dead band DB can vary. In a possible implementation, the droop can also be adjusted. FIG. 5 shows an exemplary response curve RC similar to the response curve RC1, wherein the droop of the response curve in the dead band DB at a frequency f being slightly higher than the target frequency $f_0$ is increased. In a possible implementation, a type of response curve RC as well as its droop is selected by the energy resource controller ERC depending on the state of charge SOC of the energy storage device ESD monitored by the energy resource controller ERC.

In a further possible embodiment of the charging system C-SYS according to the first aspect of the present invention, multiple response curves which in their effect range from charging or discharging of the energy storage device ESD are selected based on additional information. In a possible embodiment, the applied response curve RC is selected by the energy resource controller ERC from the response curves stored in the memory MEM depending on the monitored state of charge SOC of the energy storage device ESD and depending on additional information data supplied to the energy resource controller ERC.

This information data can comprise in a possible implementation time information data, in particular a current date and time at the location of the charging system C-SYS. For instance, if photovoltaic elements are connected to the power grid PG, a power oversupply can be expected at daytime if at least one of the photovoltaic elements is buffered by the energy storage device. Accordingly, the additional information can comprise a forecast of grid service requirements towards the energy storage device ESD.

In a still further possible embodiment, the information data supplied to the energy resource controller ERC can also comprise forecast information data, in particular weather forecast and pricing data. For instance, when the forecast weather data change towards more sunshine between forecasts made at consecutive points in time and the power grid PG comprises a plurality of photovoltaic energy sources, a power oversupply of the power grid PG can be predicted.

In a still further possible embodiment, the information data supplied to the energy resource controller ERC used to select a response curve RC can comprise sensor data, in particular temperature data.

In a still further possible embodiment, the information data used by the energy resource controller ERC can also comprise type data indicating a type of the energy storage device ESD.

Other information data can be used as well. This information data can comprise for instance detrimental effects of charging or discharging on the operation lifetime of the energy storage device ESD.

Further, the information data can comprise information about costs associated with an alternative form of energy procurement. Further, the information data can comprise a forecast of the requirement towards the energy storage device ESD originating in an application other than a grid service, such as local photovoltaic energy buffering. In this further possible implementation, the information data can also comprise a charging and discharging history of the monitored energy storage device ESD.

In a specific implementation of the above, if a forecast of a grid service requirement for a time interval $[t_i,t_j]$ is known, the energy resource controller ERC can turn this forecast into a future state of charge SOC timeline of the energy storage device ESD, for instance by starting from the state of charge SOC at a time t and adding/subtracting the energy for the forecasted grid service requirement in an interval $[t,t+\Delta t]$, multiplied by the efficiency of the system. In a possible implementation, the energy resource controller ERC can select a charging response curve if the state of charge SOC(t) at a time t in the time interval $[t_i,t_j]$ is below a critical threshold value $SOC_{min}$ and never above a critical threshold value $SOC_{max}$ in the time interval $[t_i,t_j]$. Further, the energy resource controller ERC can select a discharging response curve if the state of charge SOC(t) at a time in the time interval $[t_i,t_f]$ is above a critical threshold value $SOC_{max}$ and never below a minimum threshold value $SOC_{min}$. Further, the energy resource controller ERC can select a symmetric response curve otherwise. In a still further more advanced implementation, the charging system C-SYS can for each of a set of non-overlapping time intervals $[t_0,t_1]_j$ covering $[t_i,t_f]$ select a response curve RC so that an overall measure is optimized. In a possible embodiment, this measure can be a pre-defined cost function which can be based for instance on the degradation of the energy storage device from charging and discharging, and on the maximum and minimum states of charge and on a cost for obtaining power from a different source and for shedding power to a different sink.

In a further possible implementation of the above, if a forecast of the requirements towards the energy storage device originating in an application other than grid services in a time interval $[t_i,t_f]$ is known to the energy resource controller ERC and a forecast of the grid service requirements is also known, a possible implementation can be as outlined above, but the energy resource controller ERC can also take the requirements from the application other than grid services into account in the calculation of the state of charge timeline. If a forecast of the grid service requirements is not known, the energy resource controller ERC can determine a state of charge timeline as in the specific implementation outlined above, but in addition to the grid service requirements it does also assume the requirements for the application other than the grid service.

In a further possible embodiment, the energy resource controller ERC is informed about the temperature T of the charging system C-SYS. In this embodiment, the energy resource controller ERC can select a symmetric response curve RC if the temperature T is above a safe maximal temperature and a maximally charging or discharging response curve RC based on the state of charge SOC in relation to a target state of charge if the temperature T is below a safe minimal temperature.

In a further possible embodiment, if the charging/discharging history of the system is known to the energy resource controller ERC, it can generate a forecast of the grid service requirements as well as the requirements for an application other than the grid service from the received historical data. In a basic implementation, this can be done by using a copy of the state of charge SOC timeline from a comparable past time interval. The comparison can be based on season, time-of-day and day-of-week data.

In a still further possible embodiment of the charging system C-SYS according to the present invention, the applied response curve RC can be selected by the energy resource controller ERC from the response curves stored in the memory MEM depending on information data received from other energy resource controllers via the communication device COM. In a possible specific implementation, the energy resource controller ERC can receive from the communication device COM response curves RC from other energy resource controllers with which the energy resource controller ERC is pooled for a grid service (possibly via a control unit). The energy resource controller ERC can adjust the response curves RC for the converter CON accordingly, e.g. if other energy resource controllers predominantly choose charging response curves, the energy resource controller ERC can choose even a non-monotonous discharging response curve which can be characterized by a stronger response in the dead band DB than outside.

Accordingly, the applied response curves RC selected by the energy resource controller ERC can be chosen to fulfil one or several optimization criteria predefined by an optimization target function. The optimization criteria can for instance comprise an operation lifetime of the energy storage device ESD, a state of charge SOC of the energy storage device ESD, its temperature and communication requirements. Forecast data can be processed to calculate a prediction of the future state of charge SOC of the energy storage device ESD. The predicted state of charge SOC of the energy storage device ESD can be taken into account for selecting the response curves. Further, the behaviour of the energy storage device ESD can be used for selecting the response curves RC. In a possible embodiment, the optimization target function can be configurable by a system operator. In a possible embodiment, the optimization is performed locally by the energy resource controller ERC. In a further possible embodiment, the optimization can be performed by a remote control unit CU of the power grid PG.

The invention claimed is:

1. A charging system for charging at least one energy storage device of a power grid according to a response curve indicating a power supplied by said energy storage device to said power grid or absorbed by said energy storage device from said power grid depending on at least one grid parameter of said power grid, wherein in a dead band around a target value of said grid parameter a selected response curve is applied;
    wherein the energy storage device is connected to a converter connected to the power grid via a grid connection of said charging system;
    the charging system comprising an energy resource controller configured such that:
    a power emitted by said converter to said grid connection or absorbed by said converter from said grid connection is set according to the selected response curve applied by the energy resource controller to said converter; and
    the applied response curve is selected by the energy resource controller from the response curves stored in a memory depending on a monitored state of charge of the energy storage device and depending on additional information data supplied to said energy resource controller,
    wherein the information data comprises:
        time information data, in particular a current date and time,
        forecast information data, in particular weather forecast and pricing data,
        sensor data, in particular temperature data, and
        type data indicating a type of the energy storage device.

2. The charging system according to claim 1, wherein said energy resource controller has access to a memory storing response curves indicating the power to be supplied by said energy storage device to said power grid or to be absorbed by said energy storage device from said power grid depending on at least one grid parameter of said power grid.

3. The charging system according to claim 1, wherein the energy resource controller is connected to a local grid parameter measurement device to receive measured local grid parameters of said power grid.

4. The charging system according to claim 1, wherein the energy resource controller is connected via a communication device to a central or distributed control unit to receive grid parameters of said power grid.

5. The charging system according claim 1, wherein the energy resource controller is adapted to monitor a state of charge of the energy storage device.

6. The charging system according to claim 2, wherein the applied response curve is selected by the energy resource controller from the response curves stored in the memory depending on the monitored state of charge of the energy storage device.

7. The charging system according to claim 1, wherein the observed grid parameter is the grid frequency of the power grid.

8. The charging system according to claim 7, wherein a first response curve is stored in the memory which inhibits a power emission of the converter to said grid connection in the dead band if the observed grid frequency is lower than a target grid frequency of the power grid and which allows a power absorption of the converter from said grid connection in the dead band if the observed grid frequency is higher than the target grid frequency of the power grid.

9. The charging system according to claim 7, wherein a second response curve is stored in the memory which inhibits a power absorption of the converter from said grid connection in the dead band if the observed grid frequency is higher than the target grid frequency of the power grid and which allows a power emission of the AC-DC-converter (CON) to said grid connection in the dead band if the observed grid frequency is lower than the target grid frequency of the power grid.

10. The charging system according to claim 8, wherein the first response curve is selected by an energy resource controller if the monitored state of charge of the energy storage device is low,
wherein a second response curve is selected by said energy resource controller if the monitored state of charge of the energy storage device is high.

11. The charging system according to claim 7, wherein a third response curve is stored in said memory which inhibits a power emission of the converter to said grid connection and which inhibits a power absorption of the converter from said grid connection in the whole dead band around the target grid frequency.

12. The charging system according to claim 11, wherein the third response curve is selected by the energy resource controller if the monitored state of charge of the energy storage device is in an intermediate range between a low threshold value and a high threshold value.

13. The charging system according to claim 2, wherein the applied response curve is selected by the energy resource controller from the response curves stored in the memory depending on information data received from other energy resource controllers via the communication device.

14. The charging system according to claim 1, where the energy storage device is a lithium-ion battery.

15. A power grid comprising a plurality of energy storage devices,
wherein at least a portion of said energy storage devices is equipped with a charging system according to claim 1.

16. The power grid according to the preceding claim 15 including a control unit which exchanges information with the energy storage devices (ESD) equipped with a charging system according to claim 1.

17. A method for charging an energy storage device of a power grid according to a response curve indicating a power supplied by said energy storage device to said power grid or absorbed by said energy storage device from said power grid depending on at least one observed grid parameter of said power grid,
wherein in a dead band around a target value of said observed grid parameter a selected response curve is applied;
wherein a power emitted by a converter to a grid connection or absorbed by the converter from the grid connection is set according to the selected response curve applied by an energy resource controller to said converter, and
wherein the applied response curve is selected by the energy resource controller from response curves stored in a memory depending on a monitored state of charge of an energy storage device connected to the converter and depending on additional information data supplied to said energy resource controller,
wherein the information data comprises:
time information data, in particular a current date and time,
forecast information data, in particular weather forecast and pricing data,
sensor data, in particular temperature data, and
type data indicating a type of the energy storage device.

* * * * *